Patented Feb. 25, 1936

2,031,603

UNITED STATES PATENT OFFICE 2,031,603

PROPIONIC ACID ESTERS AND THEIR PRODUCTION

Harold S. Holt, Wilmington, Del., assignor to E. I. du Pont de Nemours & Company, Wilmington, Del., a corporation of Delaware No Drawing. Application May 3, 1932, Serial No. 609,041

7 Claims. (Cl. 260—106)

This invention relates to new esters, their preparation, and more particularly, to propionic esters of polyhydric alcohols.

An object of the present invention is to provide new esters by the reaction of polyhydric ether alcohols or polyhydric primary alcohols containing at least three alcohol groups with propionic acid possessing characteristics and properties which make them economically important in the manufacture of various cellulose derivative compositions. A further object is to provide methods of preparing these esters.

The above objects are accomplished according to the present invention by reacting a polyhydric alcohol of the type hereinafter described, or an ester thereof, with propionic acid, or an ester of such acid, to form an ester of the alcohol with the acid.

These esters may be prepared by reacting the polyhydric alcohol with propionic acid at a temperature sufficiently high to expel water formed by the reaction at substantially the rate it is formed, and/or using a catalyst such as sulphuric acid, and/or a solvent such as toluene or ethylene dichloride to aid in removing the water. Alternatively, these esters may be prepared by reacting the alkali metal salts of propionic acid, such as the sodium or potassium salts, with a chloride of the polyhydric alcohol, or by reacting a simple ester of the polyhydric alcohol with propionic acid, or by reacting a simple ester of propionic acid with the polyhydric alcohol and removing the acid or alcohol, as the case may be, formed by the reaction. Also the esters may be prepared by a simple ester interchange employing an ester of propionic acid and an ester of the polyhydric alcohol.

It is preferred to use an excess molecular proportion of propionic acid and to keep the reaction temperature above the boiling point of water, or the binary mixture of water and solvent, where a solvent is employed, or the boiling point of the acid or alcohol formed by the reaction where a simple ester of the ether alcohol or propionic acid is employed, or above the boiling point of the by-product ester where a simple ester interchange reaction is being carried out. Obviously the temperature should not exceed the boiling point of the ester being prepared and, in view of the high boiling point of the esters of the present invention, there is little danger of this.

The following examples are given to illustrate the preparation of the esters according to the present invention:

*Example 1. Diethylene glycol dipropionate.—* A mixture of 106 grams of diethylene glycol, 175 grams of propionic acid, 100 grams of toluol and 1 cc. of sulphuric acid was heated to boiling in an apparatus designed to separate the water from the distillate and to return the toluol to the reaction flask. When the theoretical amount of water had been removed the product was washed with dilute sodium carbonate solution to remove excess acid and was then vacuum distilled. The product boiled from 165–170° C. at 40 mm. pressure.

*Example 2. Triethylene glycol dipropionate.—* A mixture containing 150 grams of triethylene glycol, 175 grams of propionic acid, 100 grams of toluol and 1 cc. of sulphuric acid was heated to boiling in an apparatus similar to that described in Example 1. The product was purified as in Example 1. Triethylene glycol dipropionate boiled at 195–200° C. at 30 mm. pressure.

*Example 3. Pentaerythritol tetrapropionate.—* A mixture containing 136 grams of pentaerythritol, 350 grams of propionic acid, 100 grams of toluol, and 1 cc. of sulphuric acid was heated to boiling in an apparatus as described in Example 1. After the theoretical amount of water had been removed the product was washed with sodium carbonate solution to remove excess acid, then heated in the presence of decolorizing carbon to 170° C. at 25 mm. pressure to remove the unreacted material. The resulting product was a light colored liquid boiling above 200° C. at 10 mm. pressure.

*Example 4. Tripropionate of 1,1,1-trimethylolpropane.—*A mixture containing 134 grams of 1,1,1-trimethylolpropane (from n-butyraldehyde and formaldehyde), 250 grams of propionic acid, 100 grams of toluol, and 1 cc. of sulphuric acid was treated as in Example 3. The refined product was a water white liquid boiling above 200° C. at 10 mm. pressure.

The above examples merely illustrate specific esters coming within the scope of the present invention which includes the esters of a large number of polyhydric alcohols. These polyhydric alcohols include the class of polyhydric ether alcohols comprising those mentioned in Examples 1 and 2, and also the aryl or alkyl ethers of glycerol, pentaerythritol, sorbitol and trimethylolpropane; other polyglycols such as dipropylene glycol, dibutylene glycol, et cetera, and polyglycerols. Another class of polyhydric alcohols coming within the scope of the invention are the polyhydric primary alcohols containing at least three alcohol groups, such as pentaerythritol and trimethylolpropane.

Other polyhydric alcohols not falling within the two classes mentioned, of which propionates may be made are sorbitol, erythritol, and xylitol.

The esters of the present invention are all light colored or water white liquids of relatively high boiling points and are compatible with cellulose derivatives and readily soluble in ordinary lacquer solvents, making them highly suitable for use as plasticizers in cellulose derivative compositions.

The esters of the present invention may be used with cellulose nitrate, cellulose acetate, cellulose propionate, cellulose butyrate, cellulose acetobutyrate, cellulose nitroacetate, and other cellulose esters, ethyl cellulose, benzyl cellulose, and other cellulose ethers, with damar, ester gum, and other natural and synthetic resins, castor oil, triacetin, dimethyl phthalate, triphenyl phosphate, camphor, dibutyl phthalate, and other softeners and plasticizers, with or without the aid of solvents as alcohol for cellulose nitrate compositions, acetone for cellulose acetate compositions, and toluol-alcohol for cellulose ether compositions, with or without pigments and/or fillers.

The compositions disclosed above may be used as lacquers for coating metal and wood, in dopes for coating fabrics, in moisture proof lacquers for coating regenerated cellulose sheets, and in plastic compositions to be used in the preparation of toilet ware, novelties, sheeting, rods, and tubes.

An advantage of the esters of the present invention as plasticizers lies in their extremely low vapor pressures and their water insolubility, giving compositions which are more permanently flexible and water resistant. Many of these esters are of the type of triacetin, but are materially better than triacetin plasticizers in being less volatile and more water resistant.

As many apparently widely different embodiments of this invention may be made without departing from the spirit and scope thereof, it is to be understood that the invention is not limited to the specific embodiments thereof except as defined in the appended claims.

I claim:

1. Process of preparing an ester which comprises heating to reaction temperature a polyhydric ether alcohol, wherein no carbon atom is directly linked to more than one oxygen atom, with sufficient propionic acid to react with all the hydroxyl groups, and removing the water formed by the reaction from the reaction zone at substantially the rate it is formed until the alcohol is substantially completely esterified.

2. Process of preparing an ester, which comprises heating to reaction temperature a polyglycol wherein no carbon atom is directly attached to more than one oxygen atom, with sufficient propionic acid to react with all the hydroxyl groups and removing the water formed by the reaction from the reaction zone at substantially the rate it is formed until the polyglycol is substantially completely esterified.

3. Process of preparing an ester, which comprises heating diethylene glycol to reaction temperature with sufficient propionic acid to react with all the hydroxyl groups and removing the water formed by the reaction from the reaction zone at substantially the rate it is formed until the diethylene glycol is substantially completely esterified.

4. As a new compound, a propionic ester of a polyhydric ether alcohol wherein all the hydroxyl groups of the alcohol are esterified by propionic acid and in the alcohol portion of which no carbon atom is directly linked to more than one oxygen atom.

5. As a new compound, an ester of a polyglycol wherein all of the hydroxyl groups of the polyglycol are esterified by propionic acid and in the polyglycol portion of which no carbon atom is directly linked to more than one oxygen atom.

6. As a new compound, diethylene glycol dipropionate.

7. As a new compound, triethylene glycol dipropionate.

HAROLD S. HOLT.